Jan. 29, 1935.　　　　F. S. WRIGHT　　　　1,989,538
CONTROL SYSTEM
Filed April 28, 1934
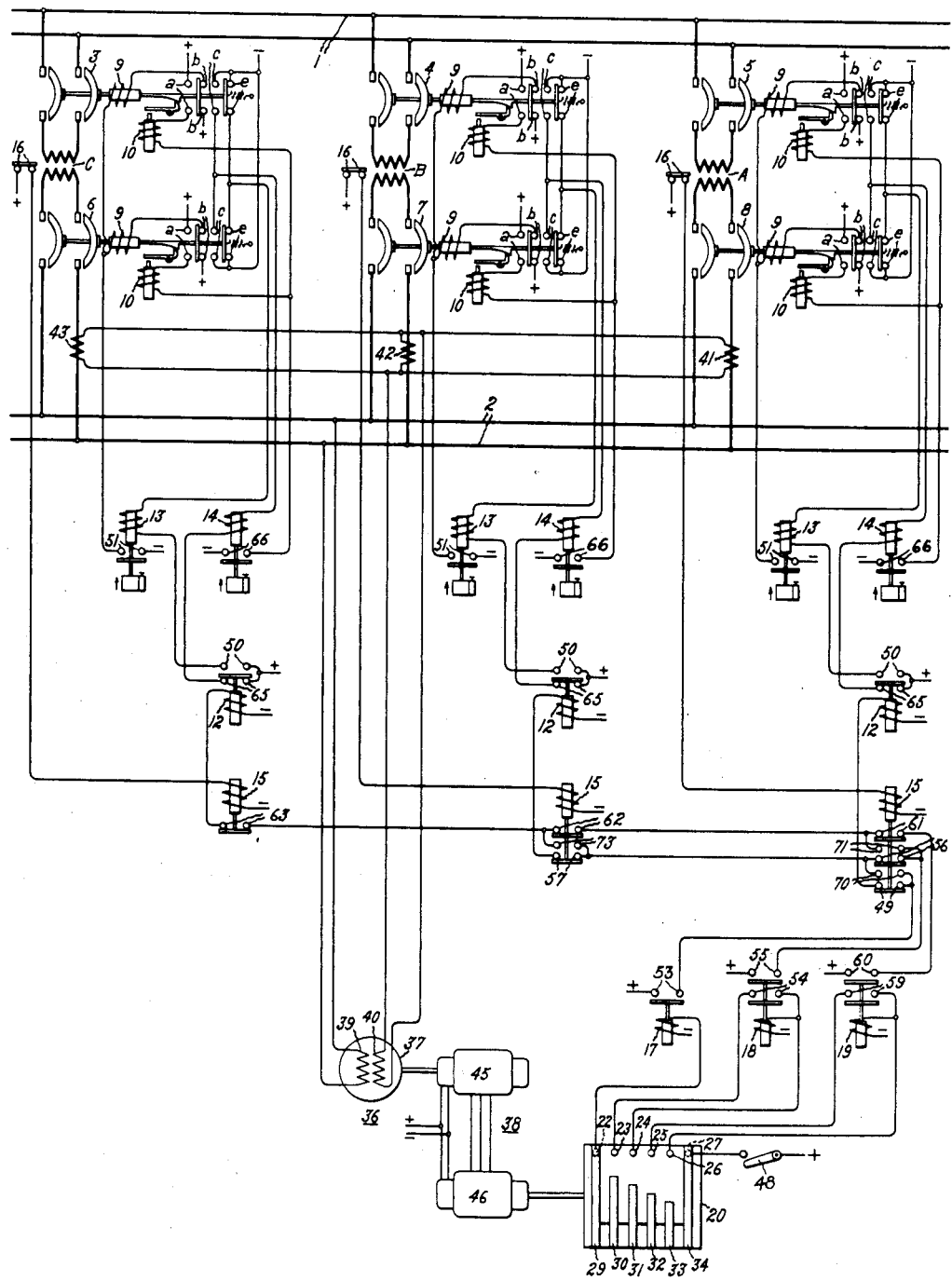
Inventor:
Fred S. Wright,
by Harry E. Dunham
His Attorney.

Patented Jan. 29, 1935

1,989,538

UNITED STATES PATENT OFFICE 1,989,538

CONTROL SYSTEM

Fred S. Wright, Kingsport, Tenn., assignor to General Electric Company, a corporation of New York Application April 28, 1934, Serial No. 722,921

7 Claims. (Cl. 171—118)

My invention relates to control systems and particularly to systems for controlling the connection between an electric circuit and a translating device, such as a transformer, motor, generator, converter or the like. More particularly my invention relates to means for controlling the connections between an electric circuit and the units of a multiple unit automatic station as the need for the various units in such a station varies.

One object of my invention is to provide an improved arrangement of apparatus whereby the connections between an electric circuit and the units in a multiple unit automatic station may be successively effected as the need for such units varies.

Another object of my invention is to provide an improved arrangement of apparatus for controlling the connections between an electric circuit and an electric translating device in response to a predetermined electrical quantity of the circuit so that the device is connected to the circuit in response to one value of the electrical quantity and is disconnected from the circuit in response to another value of the electrical quantity.

In accordance with my invention I employ a rotatable controller which, when moved in one direction, effects the connection of the translating devices to the electric circuit in a predetermined order and which, when moved in the opposite direction, effects the disconnection of the translating devices from the electric circuit in another predetermined order. The position of the controller is controlled in accordance with variations in a predetermined electric quantity of the circuit by means of a suitable device which is so connected and arranged that a rotatable member thereof varies its position directly in accordance with the variations in the predetermined electrical quantity. A suitable system for the transmission of angular motion is interposed between the rotatable member and the controller so that the position of the controller varies directly in accordance with the position of the rotatable member. Suitable means are also provided so that the controller effects the connection of the translating device to the circuit in response to a different value of the predetermined electric quantity of the circuit than the value thereof at which the controller effects the disconnection of the same translating device from the circuit, and so that values at which device is connected and disconnected can be varied.

My invention will be better understood from the following description when taken in connection with the accompanying drawing the single figure of which diagrammatically illustrates a multiple unit transformer switching station embodying my invention and its scope will be pointed out in the appended claims.

Referring to the drawing, 1 represents a relatively high voltage single phase supply circuit which is arranged to supply current to a relatively low voltage single phase load circuit 2 through a plurality of suitable translating devices, such as the single phase transformers A, B and C. While I have shown single phase circuits in order to simplify the disclosure, it will be obvious to those skilled in the art that my invention is also applicable to polyphase circuits.

Suitable switching means is provided for connecting the primary winding of each of the transformers to the supply circuit 1 and the secondary winding of each of the transformers to the load circuit 2. As shown in the drawing, the circuit breakers 3, 4 and 5 are provided for connecting the primary windings of the transformers C, B and A respectively, to the supply circuit 1 and the circuit breakers 6, 7 and 8 are provided for connecting the secondary windings of the transformers C, B and A respectively to the load circuit 2.

The circuit breakers 3-8 inclusive may be of any suitable type, examples of which are well known in the art. As shown, they are of the well-known latched-in type and each breaker is provided with a closing coil 9 and a trip coil 10.

Associated with each transformer is a master relay 12 which, when energized, completes an energizing circuit for an associated time relay 13 if either of the associated circuit breakers is open, and the time relay 13, in turn, after being energized for a predetermined time, effects the closing of the associated circuit breakers if they are open. Each master relay 12, when deenergized, completes an energizing circuit for an associated time relay 14 if either of the associated circuit breakers is closed, and the time relay 14, in turn, after being energized for a predetermined time, effects the opening of the associated circuit breakers if they are closed. Also associated with each transformer is a protective relay 15 which is connected so that it is energized when the associated transformer is in an operative condition and is deenergized when the associated transformer is in an inoperative condition. As shown in the drawing, the circuit of each relay 15 includes the contacts 16 of a suitable protective device (not shown) which will open the contacts 16 when the associated transformer is in a predetermined inoperative condition, such for example as an obnormally high temperature condition. Each relay 15 controls the circuit of the associated control relay 12 so that each relay 12 can be energized only when the associated protective relay 15 is energized.

The order in which the transformers A, B and C are placed in service and are removed from service is determined by the order in which the master control relays 17, 18 and 19 are energized and deenergized. When all of the protective relays 15 are energized, the energization of the relays 17, 18 and 19 respectively effects the connection of the transformers A, B and C between the circuits 1 and 2 and the deenergization of the relays 17, 18 and 19 respectively effects the disconnection of the transformers A, B and C from between the circuits 1 and 2. If the transformer A is in an inoperative condition so that the relay 15 associated therewith is deenergized, this relay transfers the control so that the master control relays 17 and 18 then control the connection of the transformers B and C respectively. If only the transformer B is inoperative, then the master control relay 17 controls the connection of the transformer A and the master control relay 18 controls the connection of the transformer C. If both of the transformers A and B are inoperative, then the master control relay 17 controls the connection of the transformer C.

In order to effect the sequential operation of the master control relays 17, 18 and 19 in response to different predetermined values of load as the load connected to the load circuit 2 increases and in response to other predetermined values of load as the load connected to the load circuit 2 decreases, I provide, in accordance with my invention, a controller 20 which, in the particular embodiment shown in the drawing, is of the well-known drum type. As shown, the controller has a plurality of stationary contacts 22–27 inclusive which are respectively engaged by the movable contacts 29–34 inclusive. These contacts are so arranged that a circuit is continuously completed between contact 27 and contact 22 and as the controller 20 rotates in one direction, circuits are successively completed between the contact 27 and the stationary contacts 23–26 inclusive and when the controller rotates in the reverse direction, the circuits between these contacts are interrupted in the reverse order. The master control relay 17 is connected to the contact 22 so that an energizing circuit is continuously completed for this relay when the master control switch 48 is closed. This master control switch is shown as a manually controlled device, and is closed whenever it is desired to have any of the translating devices in operation. When the contacts 24 and 31 are in engagement, a circuit is completed for the master control relay 18, which completes through its contacts 54 a locking circuit for itself through the contacts 23 and 30 of the controller. Therefore, it will be seen that the energization of the relay 18 is effected in one position of the controller and the deenergization of the relay 18 is effected in a different position of the controller. The relay 19 is connected in a similar manner to contacts 25 and 26 so that it is deenergized in a different position of the controller from that in which it is energized.

For rotating the controller 20 so that its position corresponds to the load connected to the load circuit 2, I provide a load responsive device 36 which has a rotatable member 37 and which is so connected that the position of the rotatable member 37 varies directly with the load connected to the load circuit 2. Between the rotatable member 37 and the controller 20 I interpose a suitable system for transmitting angular motion 38, whereby the position of the controller 20 varies in accordance with the position of the rotatable member 37. As shown, the load responsive device 36 is a wattmeter, the rotatable element of which varies its position directly in accordance with the total number of watts supplied to the load circuit 2 by all of the transformers A, B and C. This result is accomplished by connecting the voltage element 39 of the wattmeter 36 so that it is energized in response to the voltage of the load circuit 2 and by connecting the current winding 40 of the wattmeter across the parallel connected secondary windings of the current transformers 41, 42, 43, the primary windings of which are respectively connected in series relation with the secondary windings of the transformers A, B and C. The current winding 40, therefore, is energized by the sum of the currents flowing through the secondary windings of the transformers 41, 42 and 43 so that the position of the rotatable element 37 varies in accordance with the total load connected to the load circuit 2.

The rotatable element 37 of the wattmeter 36 is connected to the rotatable element of a transmitter 45 of the system for transmitting angular motion 38, and the controller 20 is connected to the rotatable element of the receiver 46 of such a system. Therefore, as the position of the rotatable element 37 varies in response to variations in the load connected to the load circuit 2, the position of the controller 20 varies accordingly.

The movable contacts 30–33 inclusive of the controller 20 are so located that when there is no power being supplied to the load circuit 2 by the transformers A, B and C, these contacts are in the positions shown, in which they engage none of the stationary contacts 23–26 inclusive. When the current is being supplied to the load circuit and the load is within the capacity of a single transformer, the position of the controller 20 is also such that the movable contacts 30–33 do not engage any of the contacts 23–26. When the load increases to such a value that it is desirable to have two transformers in service, the position of the controller 20 is such that the movable contacts 30–31 inclusive respectively engage the stationary contacts 23–24 inclusive so that both of the master control relays 17 and 18 are energized if switch 48 is closed. When the load increases to such a value that it is desirable to have the three transformers in operation, the position of the controller 20 is such that the contacts 30–33 inclusive respectively engage the contacts 23–26 inclusive so that the three master control relays 17, 18 and 19 are energized if switch 48 is closed.

The operation of the arrangement shown is as follows: When all of the transformers are disconnected from the load circuit 2, and the switch 48 is open, the various control devices are in the positions shown if each transformer is in an operative condition so that its respective protective relay 15 is energized.

When it is desired to initiate the operation of the switching means shown, the control switch 48 is closed so as to complete an energizing circuit from one side of a suitable control circuit through contacts of control switch 48, contacts 27, 34, 29 and 22 of controller 20, winding of relay 17 to the other side of the control circuit. By closing the contacts 53, relay 17 completes a circuit from one side of the control circuit through contacts 49 of relay 15 associated with transformer A, winding of relay 12 associated with transformer A to the other side of the control circuit. This relay 12 by closing its contacts 50 completes through the parallel connected contacts e on switches 5 and 8 an energizing circuit for the time relay 13 associated with the transformer A. After this relay 13 has been energized for a predetermined time, it closes its contacts 51 and completes through the contacts b on switch 5 an energizing circuit for the closing coil 9 of the switch 5 and through the contacts b on the switch 8 a circuit for the closing coil 9 of the switch 8. The closing of the switches 5 and 8 connects the transformer A between the supply circuit 1 and the load circuit 2. As soon as the transformer A begins to supply current to the load circuit 2, the rotatable element 37 of the wattmeter 36 takes up a position in accordance with the amount of power supplied to the load circuit. As the position of the rotatable element 37 varies, the system for transmitting angular motion 38 causes the controller 20 to take up a corresponding position.

When the load connected to the load circuit 2 increases to such a value that a second transformer should be placed in service, the position of the wattmeter 36 is such that the system for transmitting angular motion 38 causes the contact 31 of the controller 20 to engage the stationary contact 24 and thereby complete an energizing circuit for the relay 18. By closing its contacts 54 the relay 18 completes a locking circuit for itself through the contacts 23 and 30 of the controller 20. By closing its contacts 55 the relay 18 completes a circuit from one side of the control circuit through the contacts 56 of the protective relay 15 associated with the transformer A, contacts 57 of the protective relay 15 associated with the transformer B, winding of the relay 12 associated with the transformer B to the other side of the control circuit. By closing its contacts 50, the master relay 12 associated with the transformer B then effects the closing of the circuit breakers 4 and 7 in the same manner that the closing of the contacts 50 of the master relay 12 associated with the transformer A effected the closing of the circuit breakers 5 and 8.

When both of the transformers A and B are in service and the load connected to the load circuit 2 increases to such a value that a third transformer is needed in service, the position of the wattmeter 36 is such that the system for transmitting angular motion 38 causes the contact 33 of the controller 20 to engage the stationary contact 26 so that an energizing circuit is completed for the master control relay 19. By closing its contacts 59 the relay 19 completes a locking circuit for itself through the contacts 25 and 32 of the controller 20. By closing its contacts 60, the relay 19 completes an energizing circuit from one side of the control circuit through the contacts 61 of the protective relay 15 associated with the transformer A, the contacts 62 of the protective relay 15 associated with the transformer B, the contacts 63 of the protective relay 15 associated with the transformer C, the winding of relay 12 associated with transformer C to the other side of the control circuit. By closing its contacts 50, the master relay 12 associated with the transformer C then effects the closing of the circuit breakers 3 and 6 in the same manner that the closing of the contacts 50 of the master relay 12 associated with the transformer A effected the closing of the circuit breakers 5 and 8.

When all of the transformers are in service and the load decreases to such a value that one of the transformers should be removed from service, the position of the wattmeter 36 is such that the system for transmitting angular motion 38 causes the controller segment 32 to disengage the contact 25 thereby interrupting the holding circuit for the master control relay 19. By opening its contacts 60, the master control relay 19 interrupts the above-traced circuit for the master relay 12 associated with the transformer C. This relay 12 by closing its contacts 65 completes through the parallel connected contacts c on the circuit breakers 3 and 6, an energizing circuit for the time relay 14 associated with the transformer C. After this relay 14 has been energized for a predetermined time, it closes its contacts 66 and completes through the contacts a of the circuit breaker 3 an energizing circuit for the trip coil 10 of the circuit breaker 3 and through the contacts a of the circuit breaker 6 an energizing circuit for the trip coil 10 of the circuit breaker 6. The opening of the circuit breakers 3 and 6 disconnects the transformer from the supply circuit 1 and the load circuit 2.

Similarly, when the load decreases below a still lower value so that the contacts 30 of the controller 20 move out of engagement with the contact 23, the master control relay 18 is deenergized. This relay 18 by opening its contacts 55 interrupts the above-traced circuit for the master relay 12 associated with the transformer B. This relay 12 by closing its contacts 65 then effects the opening of the circuit breakers 4 and 7 in the same manner that the closing of the contacts 65 of the master relay 12 associated with the transformer C effected the opening of the circuit breakers 3 and 6.

In case the entire load is disconnected from the load circuit, the controller 20 moves to its original position, but the master relay 17 remains energized so that the transformer A remains in service if the master control switch 48 is still closed.

As pointed out heretofore, the controller contacts are so arranged that the energization of each master control relay is effected in response to a higher value of load than the value which effects the deenergization of the same master control relay. This insures that there will be no "pumping" of the circuit breakers which connect the transformers to the supply and load circuits.

If the transformer A is inoperative so that its associated protective relay 15 is deenergized when the master control relay 17 is energized, this relay 15 by opening its contacts 49 and closing its contacts 70 causes the deenergization of the master relay 12 associated with transformer A to effect the opening of circuit breakers 5 and 8 if they are closed, and the master relay 12 associated with the transformer B, if it is operative, to be controlled by the relay 17. Also the relay 15 associated with the transformer A by opening its contacts 61 and closing its contacts 71 causes the master relay 12 associated with the transformer C to be controlled by the master control relay 18. Similarly, if the transformer B is inoperative, its associated protective relay 15 by opening its contacts 57 and 62 and closing its contacts 73 causes the deenergization of the master relay 12 of the transformer B to effect the opening of circuit breakers 4 and 7 if they are closed, and places the master relay 12 of the transformer C, if it is operative, under the control of the master control relay which would control the master relay 12 associated with the transformer B if it were operative.

Therefore, it will be seen that when a transformer becomes inoperative, the control for that transformer is transferred to the next operative transformer so that it, in turn, is controlled in exactly the same way the inoperative transformer would be controlled if it were operative.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a load circuit, a plurality of supply circuits, and means for controlling the connection between said supply circuits and said load circuit in accordance with the load connected to said load circuit including a controller, a rotatable member, means controlled by the load connected to said load circuit for moving said member so that the position thereof varies directly with the load, and a system for the transmission of angular motion interposed between said movable member and said controller to vary the position of said controller in accordance with the position of said member.

2. In combination, an electric circuit, a plurality of translating devices, and means for controlling the connection between said circuit and said devices in accordance with the load connected to said circuit including a controller, a rotatable member, means controlled by the load connected to said circuit for moving said member so that the position thereof varies directly with the load, and a system for the transmission of angular motion interposed between said member and said controller to vary the position of said controller in accordance with the position of said member.

3. In combination, an electric circuit, a plurality of translating devices, and means for controlling the connection between said circuit and said devices in accordance with the load connected to said circuit including an individual control relay normally associated with each translating device, means associated with each relay for effecting the connection of the associated device to said circuit when the relay is energized and the disconnection of the associated device when the relay is deenergized, a controller for energizing said relays in a predetermined order when operated in one direction and for deenergizing said relay in a predetermined order when operated in the reverse direction, a rotatable member, means controlled by the load connected to said circuit for moving said member so that the position thereof varies directly with the load, and a system for the transmission of angular motion interposed between said member and said controller to vary the position of said controller in accordance with the position of said member.

4. In combination, an electric circuit, a plurality of translating devices, and means for controlling the connection between said circuit and said devices in accordance with the load connected to said circuit including an individual control relay normally associated with each translating device, means associated with each relay for effecting the connection of the associated device to said circuit when the relay is energized and the disconnection of the associated device when the relay is deenergized, a controller for energizing said relays in a predetermined order when operated in one direction and for deenergizing said relay in a predetermined order when operated in the reverse direction and said controller occupies different positions than it occupies when it effects the energization of said relays, a rotatable member, means controlled by the load connected to said circuit for moving said member so that the position thereof varies directly with the load, and a system for the transmission of angular motion interposed between said member and said controller to vary the position of said controller in accordance with the position of said member.

5. In combination, an electric circuit, a translating device, and means for controlling the connection between said circuit and said device including a control relay associated with said device, means associated with said relay for effecting the connection of said device to said circuit when said relay is energized and the disconnection of the said device when said relay is deenergized, means including a controller for energizing said relay when said controller is in one position and for deenergizing said relay when said controller is in a different position, a rotatable member, means controlled by a predetermined electrical condition of said circuit for moving said member so that the position thereof varies directly with said electrical condition, and a system for the transmission of angular motion interposed between said member and said controller to vary the position of said controller in accordance with the position of said member.

6. In combination, an electric circuit, a plurality of translating devices, and means for controlling the connection between said circuit and said devices in accordance with the load connected to said circuit including an individual control relay normally associated with each translating device, means associated with each relay for effecting the connection of the associated device to said circuit when the relay is energized and the disconnection of the associated device when the relay is deenergized, a controller for energizing said relays in a predetermined order when operated in one direction and for deenergizing said relay in a predetermined order when operated in the reverse direction and said controller occupies different positions than it occupies when it effects the energization of said relays, a rotatable member, a wattmeter responsive to the total power flowing between said circuit and devices for moving said member so that the position thereof varies directly with the total power, and a system for the transmission of angular motion interposed between said member and said controller to vary the position of said controller in accordance with the position of said member.

7. In combination, a load circuit, a plurality of transformers and means for controlling the connection between said circuit and transformers in accordance with the load connected to said circuit including a controller, a rotatable member, a wattmetric device responsive to the total power flowing between said transformers and load circuit for moving said member so that the position thereof varies directly with the total power, and a system for the transmission of angular motion interposed between said member and said controller to vary the position of said controller in accordance with the position of said member.

FRED S. WRIGHT.